(12) United States Patent
Gold et al.

(10) Patent No.: US 11,119,996 B2
(45) Date of Patent: Sep. 14, 2021

(54) SYSTEM AND METHOD OF BLOOM FILTER FOR BIG DATA

(71) Applicant: SQream Technologies LTD., Tel Aviv (IL)

(72) Inventors: Israel Gold, Haifa (IL); Yanai Nani Eliyahu, Givatayim (IL)

(73) Assignee: SQREAM TECHNOLOGIES LTD., Tel Aviv (IL)

( * ) Notice: Subject to any disclaimer, the term of this patent is extended or adjusted under 35 U.S.C. 154(b) by 262 days.

(21) Appl. No.: 16/249,098

(22) Filed: Jan. 16, 2019

(65) Prior Publication Data
US 2020/0226112 A1 Jul. 16, 2020

(51) Int. Cl.
*G06F 16/22* (2019.01)

(52) U.S. Cl.
CPC ...... *G06F 16/2237* (2019.01); *G06F 16/2255* (2019.01)

(58) Field of Classification Search
CPC ............ G06F 16/2455; G06F 16/9014; G06F 16/2237; G06F 16/2255; G06F 16/27
USPC ........................................................ 707/747
See application file for complete search history.

(56) References Cited

U.S. PATENT DOCUMENTS

| | | | | |
|---|---|---|---|---|
| 8,266,506 B2* | 9/2012 | Hao | ...................... | H03M 13/13 714/777 |
| 8,972,651 B2* | 3/2015 | Kawamura | ........... | G06F 3/0619 711/103 |
| 9,529,537 B2* | 12/2016 | Kawamura | ........... | G06F 3/0689 |
| 2008/0155229 A1* | 6/2008 | Beyer | ..................... | G06F 17/10 711/216 |
| 2010/0269024 A1* | 10/2010 | Hao | ...................... | H03M 13/13 714/777 |
| 2011/0276744 A1* | 11/2011 | Sengupta | ............ | G06F 12/0246 711/103 |
| 2011/0307447 A1* | 12/2011 | Sabaa | ............... | G06F 16/24556 707/637 |
| 2014/0244779 A1* | 8/2014 | Roitshtein | ............ | H04L 45/748 709/213 |
| 2017/0177266 A1* | 6/2017 | Doerner | .............. | G06F 16/1752 |

OTHER PUBLICATIONS

Bloom filter, Wikipedia, //en.wikipedia.org/wiki/Bloom_filter, Jan. 29, 2019, pp. 1-18.

(Continued)

*Primary Examiner* — Shahid A Alam
(74) *Attorney, Agent, or Firm* — Browdy and Neimark, P.L.L.C.

(57) ABSTRACT

A method for applying bloom filter on a large data set consisting of key-value pairs, using at least one processor includes: partitioning large data-set of key-value pairs into data chunks; determining Bloom filter Vector and number of segments in the vector for each data chunk; Encoding all keys of a given Chunk into a Bloom filter vector; Determining the segment-id of a given key using H (0) hash function; Encoding Key into a Bloom filter segment with the determined segment-id, using a K-bit array produced by H1, . . . Hk functions; and Packing of segments into extent data structures where each extent includes segments of different chunks, but with the same segment-id wherein a single extent filters multiple chunks, depending on a packing factor (the number of segments packed into a single extent).

15 Claims, 10 Drawing Sheets

(56) References Cited

OTHER PUBLICATIONS

Bloom, Burton H., Space/Time Trade-offs in Hash Coding with Allowable Errors, Communications of the ACM, Jul. 1970, pp. 422-426, vol. 13, No. 7.
Putze etal, Cache-, Hash-, and Space-Efficient Bloom Filters, J. Exp. Algorithmics, 2010, pp. 1-18.
Kaier T., Cache Efficient Bloom Filters for Shared Memory Machines, MIT Computer Science and Artificial Intelligence Laboratory, 2013, pp. 1-15.

* cited by examiner

Packing bloom filter segments 20

- packing of segments into extents (data structure) where each extent includes segments that belong to different chunks with but have the same segment id (also termed below as segment index) — 202
- Determining packing factor (The number of the segments in each extent) for example can be determined by read memory size (packing factor) — 204
- Packing into a single extent consecutive P segments of the same index according to chunk order — 206
- Generating extent/segment map — 208

Figure 4

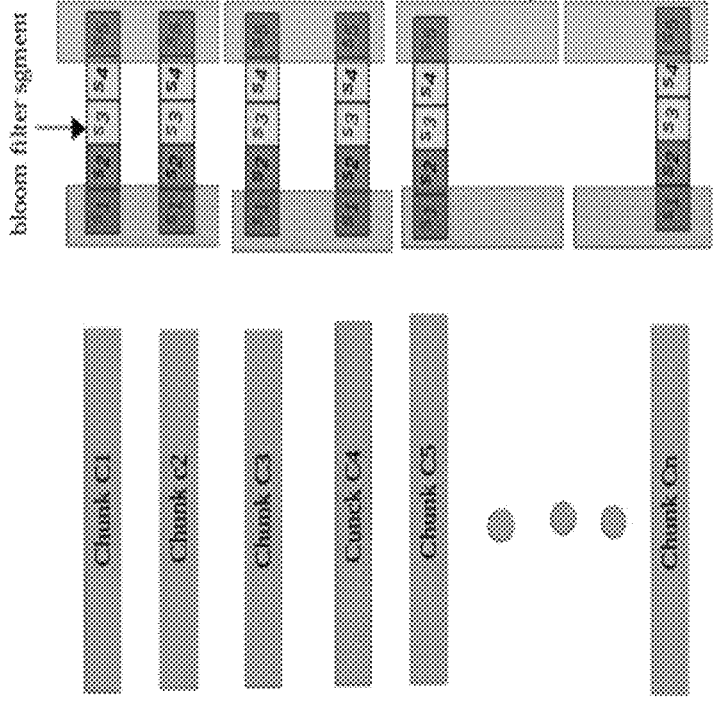

Figure 4A

28 Compute segment ID and hash bits vector

- 282 Applying $h_0$ function on key value to compute segment id/index
- 284 Applying $h_1$ function on key value to compute hash bits vector for Each key-value

Figure 5

```
int hash_bits[k];
segment_id = h_0(key-value);
// compute hash_bits[]
bit_size = segment_size * 8;
for i=1,..k {
    x = h_1(key) mod bit_size;
    hash_bit[i]= x;
}
```

Figure 5A chunk filtering — 30 select all big-table extents and for each extent E, determine whether, or not, the chunks represented by E needs to be included in the SELECT by applying extent processing. — 302

```
for each extent record E in
    select E.extent_number, E.extent_size, E.extent_filepath
    from extent-map E,
    where E.key = key and E.segment_id = segment_id
{
    unsigned char extent_buf[E.extent_size];
    fd = fdopen( E.extent_filepath, O_RDONLY);
    pread(fd, extent_buf, E.extent_size, 0);
    close(fd);

int ignore_chunk_vec[pack_factor];
    BDBF_PROCESS_EXTENT(key, segment_id, E.extent_number,
                        extent_buf, ignore_chunk_vec);
    for (i=0; i++; i<pack_factor) {
        int chunk_number = ignore_chunk_vec[i];
        if (chunk_number != -1)
            ignore data chunk with number chunk_number
    }
}
```

34
key-value membership test for single segment by index

342 Test membership for key value of Bloom filter for segment sj of size Z bytes, by applying k hash functions

344 Calculate x key value by applying $h_i$(key-value)

346 Check if X bit is true or false in segment

Figure 8

```
bool Key_Test(s, seg_size, key-value)
{
    bool test = true;
    bit_size = seg_size * 8;
    for i=1,k {
        x = h_i(key-value) mod bit_size;
        if the x bit of segment s is false;
            test = false;
    }
    return test;
}
```

Figure 8A

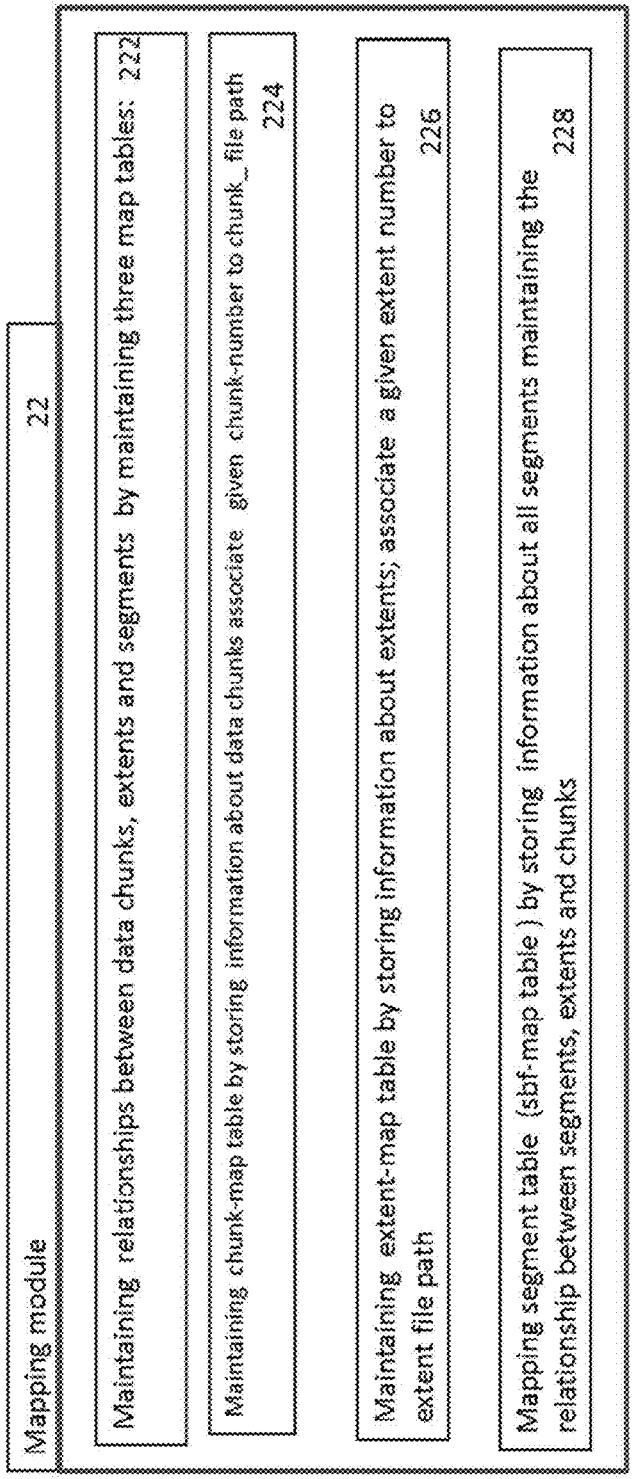

Figure 9

```
segment-map(key,       // key field to which segment applies
  segment_id,    // id of SBF segment to which extent
                 // applies; derived from h₀(key-value)
  segment_number,// unique number per segment_map?
  extent_number, // extent containing this segment
  chunk_number,  // chunk to which segment applies
  seg_index,     // index number inside extent
  seg_offset,    // byte offset within extent file
  seg_size)      // byte size of segment
```

Figure 9A

SYSTEM AND METHOD OF BLOOM FILTER FOR BIG DATA

BACKGROUND

A Bloom filter is a space-efficient probabilistic data structure, conceived by Burton Howard Bloom in 1970, that is used to test whether a key is a member of a set. False positive matches are possible, but false negatives are not. The advantage of a Bloom filter over the "conventional" dictionary structures is space efficiency. A Bloom filter needs only a constant number of bits per element, while keeping the false positive rate constant, independent of the size of the elements it is filtering.

Bloom filters have been implemented in some very successful and widely deployed systems. For example, Google's Bigtable and Facebook's RocksDB employ Bloom filter to avoid performing disk lookups for non existing data.

Recently a Bloom filter variant has been proposed to improve the performance of small hardware tables like processor caches. The blocked bloom filter [BLO], developed by Putze [3] provide a potential solution for the poor memory locality of standard bloom filters. A BLO filter is composed of b smaller and equal size blocks, each managed as a standard bloom filters. In addition, each element is mapped to k bits within a single randomly assigned bloom filter block. Putze [3] claims that BLO filter is more cache efficient by suffering less cache misses. In this document we describe a novel Bloom filter variant for big data sets containing billion of elements. We present of a novel big data bloom filter (BDBF) algorithm that improves the I/O and access times of key search in big tables.

REFERENCES

[1] Bloom, Burton H. (1970), "Space/Time Trade-offs in Hash Coding with Allowable
   Errors", Communications of the ACM, 13 (7): 422-426, doi:10.1145/362686.362692
[2] Bloom Filter on Wikipedia
[3] F. Putze, P. Sanders, and J. Singler. Cache-, hash-, and space-efficient bloom filters.
   J. Exp. Algorithmics, 14:4:4.4-4:4.18, January 2010.
[4] Kaler T., Cache Efficient Bloom Filters for Shared Memory Machines http://tfk.mit.edu/pdf/bloom.pd

TECHNICAL FIELD

The present invention relates to efficient searching of big data using space-efficient probabilistic data structure like bloom filter. Most applicable usage is searching large key-value stores and/or big database tables.

BRIEF SUMMARY

The present invention provides a method for applying bloom filter on a large data set consisting of key-value pairs, using at least one processor. The method comprising the step of:
  partitioning large data-set of key-value pairs into data chunks;
  determining Bloom filter Vector and number of segments in the vector for each data chunk;
  Encoding all keys of a given Chunk into a Bloom filter vector;
  Determining the segment-id of a given key using H (0) hash function;
  Encoding Key into a Bloom filter segment with said determined segment-id, using a K-bit array produced by H1, . . . Hk functions; and
  Packing of segments into extent data structures where each extent includes segments of different chunks, but with the same segment-id.

wherein a single extent filters multiple chunks, depending on a packing factor (the number of segments packed into a single extent).

According to some embodiments of the present invention the method further comprising the steps of:
  applying $h_0$ function on a given key value to compute segment sj id/index;
  applying $h_j$ function on key value to compute hash bits vector for the given key-value;
  testing membership for the given key value of Bloom filter for segment sj, by applying k hash functions.

According to some embodiments of the present invention the encoding Key into a Bloom filter segment, is implemented by a Bloom filter with s segments of size Z bytes, and k hash functions, apply key-value insertion by: set all bit of segment $s_j$ to false and determine which bit of segment $s_j$ are set to true by applying $h_i$(key-value).

According to some embodiments of the present invention the method further comprising the step of determining packing factor (The number of the segments in each extent) is determined by read memory size.

According to some embodiments of the present invention the method further comprising the step of maintaining relationships between data chunks, extents and segments by maintaining at least one map table.

According to some embodiments of the present invention the extent structure is a bit array structure, ordered by the index.

According to some embodiments of the present invention the extent structure filter out multiple chunks in parallel and reduce the number of files required for holding the Bloom filter, guaranteeing that each key is hashed into exactly a single segment requiring only to read and inspect the extents corresponding to that segment-id.

The present invention provides a system for applying bloom filter on large data table of key-value for enabling efficient member testing, said system comprising a non-transitory storage device and one or more processing devices operatively coupled to the storage device on which are stored modules of instruction code executable by the one or more processors:
  bloom filter module for determining Bloom filter Vector and number of segments in the vector for each data chunk and encoding All Keys of a given, Chunk into a Bloom filter vector, Determining the segment ID of a given key using H (0) hash function, wherein the large data table of key-value pairs partitioned into data chunks;
  computation module for encoding Key into Bloom filter segments using a K-bit array produced by H1, . . . Hk functions; and
  packing module for packing of segments into extents data structure where each extent includes segments of different chunks with the same id./index.

According to some embodiments of the present invention the encoding Key into Bloom filter segments, is implemented by for a Given a Bloom filter with s segments of size Z bytes, and k hash functions, apply key-value insertion by: set all bit of segment $s_j$ to false and Determine which bit of segment $s_j$ are set to true by applying $h_i$(key-value).

According to some embodiments of the present invention the packing module further comprising the step of determining packing factor is determined by read memory size.

According to some embodiments of the present invention the systems further comprising the mapping module for maintaining relationships between data chunks, extents and segments by maintaining at least one map table.

According to some embodiments of the present invention the extent structure is a bit array structure, ordered by the index.

According to some embodiments of the present invention the extent structure enable to filter out multiple chunks in parallel and reduce the number of files required for holding the Bloom filter, guaranteeing that each key is hashed into exactly a single segment requiring only to read and inspect the extents corresponding to that segment-id.

According to some embodiments of the present invention the segments can be identified using the segment map using the key, segment id and extent number values.

BRIEF DESCRIPTION OF THE DRAWINGS

The present invention will be more readily understood from the detailed description of embodiments thereof made in conjunction with the accompanying drawings of which:

FIGS. 4 and 4A are a flow diagram, depicting the processing of packing bloom filter segments, according to some embodiments of the invention.

FIGS. 5 and 5A is a flow diagram and pseudo-code, respectively, depicting the processing of computing segment ID and hash bits vector according to some embodiments of the invention.

FIGS. 6 and 6A is a flow diagram and pseudo-code, respectively, of chunk filtering processing according to some embodiments of the invention.

FIGS. 8 and 8A is a flow diagram and pseudo-code, respectively, of key-value membership test processing, processing according to some embodiments of the invention.

FIGS. 9 and 9A is a flow diagram and pseudo-code, respectively, of mapping module processing according to some embodiments of the invention

DETAILED DESCRIPTION

Figure 1:
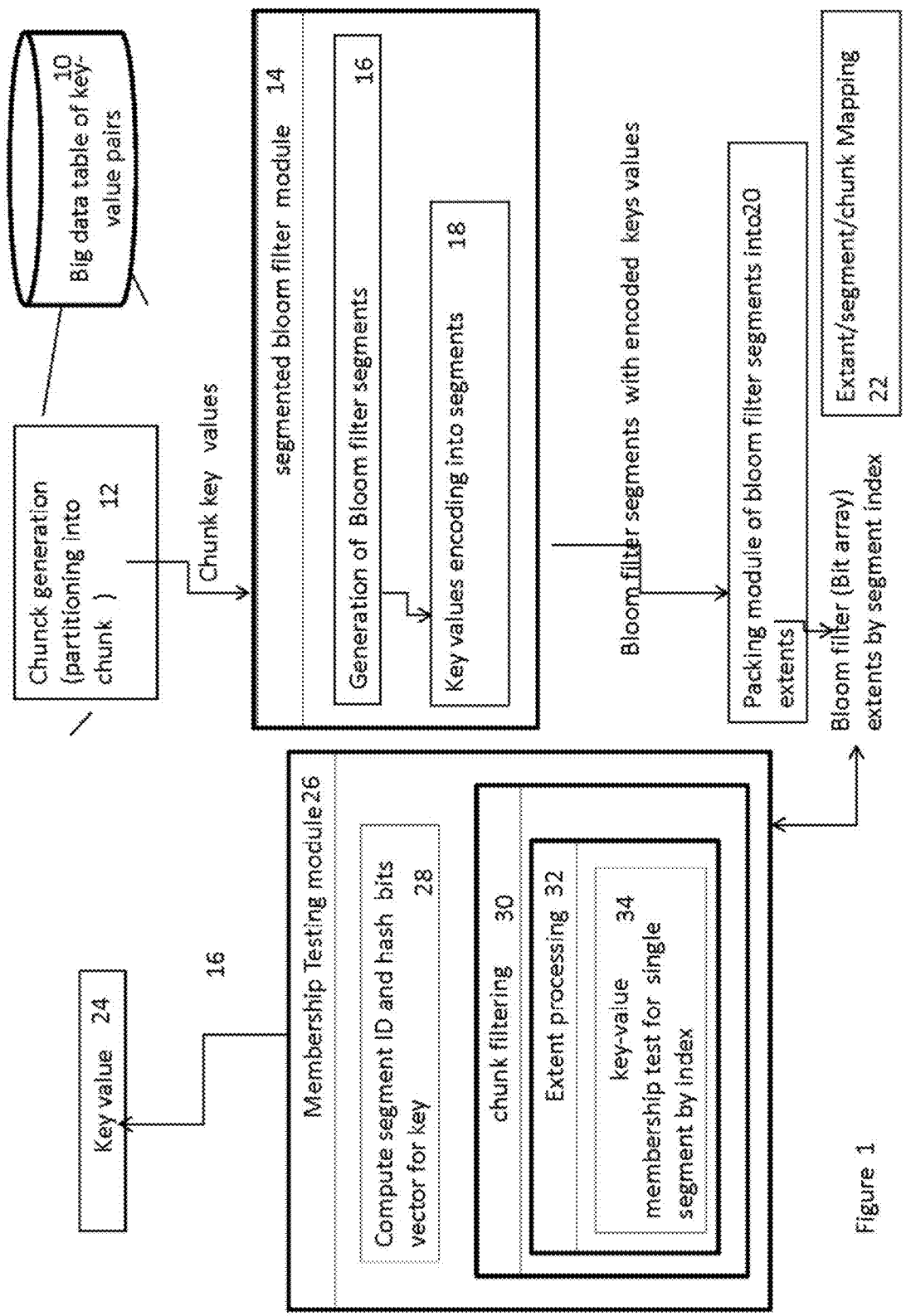
FIG. 1 depicts a block diagram, presenting components for applying enhance the bloom filter processing according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| Bloom filter | Effective method of indexing large amounts of data by combining hashing and a bit array. The method is used to determine whether a given value is definitely not, or possibly in, a set of values |
| Segmented Bloom filter | A bloom filter that is divided into equal size segments, where each segment is managed as a regular bloom filter |
| Segment-id | A Segmented Bloom Filter may consists of n segments marked a S1, S2, . . . , Sn Segment Si has segment-id of i or index i. |
| Extent | A collection of bloom filter segments, where all segments in this collection have the same segment-id |
| Packing factor | The number of segments to pack into a single extent |
| Chunk | A collection of key-value pairs. |
| BDBF | Big Data Bloom Filter algorithm which improves the I/O and access times of data search operations in big tables |
| SBF segments | Set of segments that make up a segmented bloom filter |

The present invention provides a new solution for applying SELECT query for a big dataset consisting of key values pairs. The simple SELECT query, below, exemplify the problem:

```
SELECT * FROM big_table bt
    WHERE bt.uuid = 'B667B973-2D77-412C-BFA1-85204524AC82'
```

Bloom filter acts as "index like" method; it can filter out key values that we definitely know not to be in big table.

Dividing a big table into chunks enables to create a collection of bloom filters which can be easily managed, such that each chunk may be filtered out separately. For more effective chunks filtering, it is suggested according to the present invention to build a Segmented Bloom Filter for each chunk, and pack the segments with the same index into extent data structures. This novel approach facilitates an extent structure having the same size as the original segmented bloom filters which enables to filter out multiple chunks, rather than processing of single chunks as known in prior art.

FIG. 1 depicts a block diagram, presenting components for applying enhance the bloom filter on big data processing according to some embodiments of the invention. A big data table of key-value pairs is partitioned into chunks. Each chunk key values are processed by segmented bloom filter module 14. At the first stage are generated Bloom filter segments (16), into these segments are encoded key values (18). At the next stage the Bloom filter segments with encoded keys values, are packed into data structure of extents. Each extent only includes segments with the same index; the extent may include some of the segments with the same index or all of them, according to predefined packing factor. The extents are saved in a bit array structure, ordered by their number. To enable efficient data retrieval the extents are mapped to be associated with the segment ID and chunk ID.

Figure 2:
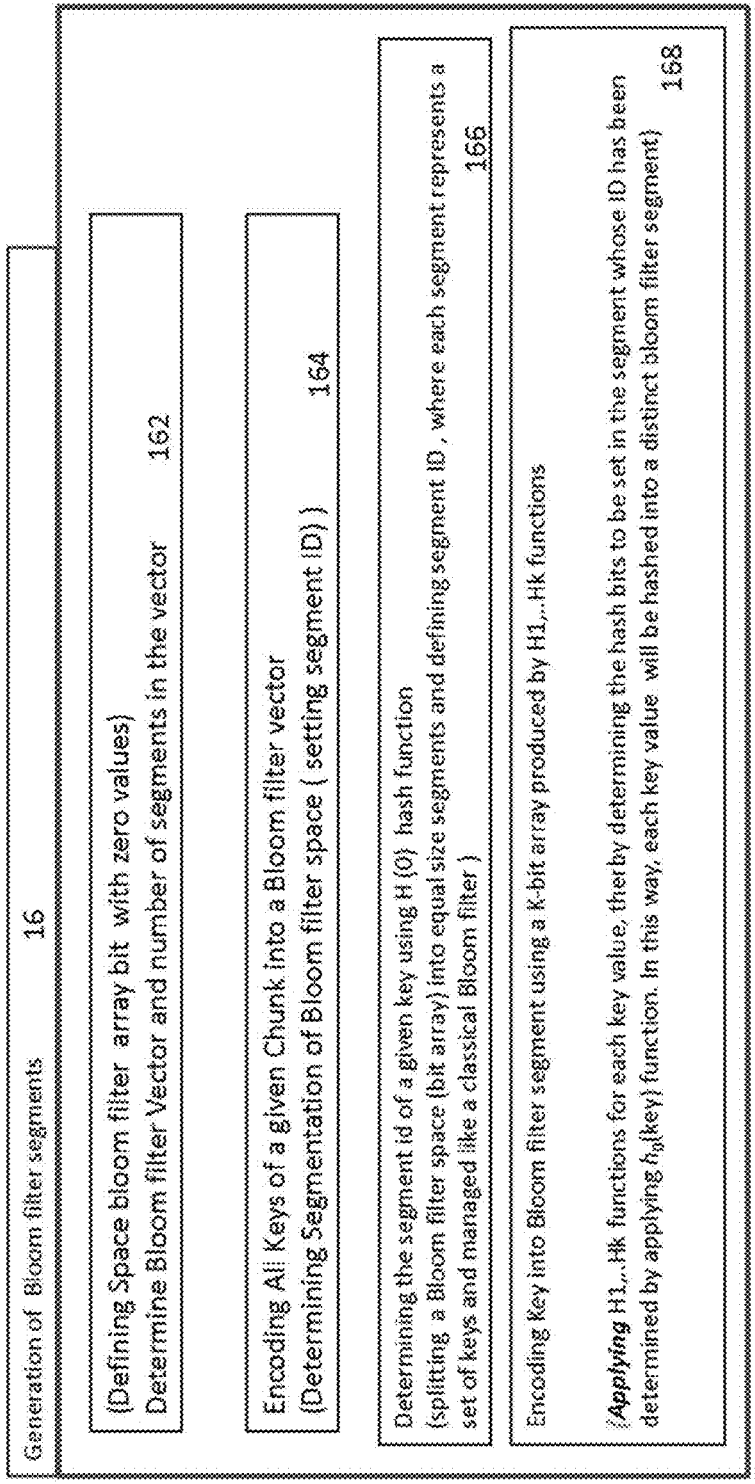
FIGS. 2 and 2A depicts a flow diagram elaborating Generation of Bloom filter segments, according to some embodiments of the present invention.
Figure 2A:
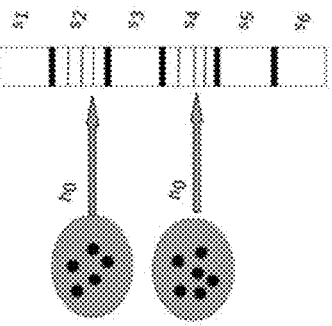

FIGS. 2 and 2A depict a flow diagram elaborating the processing of generating of Bloom filter segments, according to some embodiments of the present invention. This processing includes the following steps:

Determining Bloom filter Vector and number of segments in the vector (step 162);

Encoding All Keys of a given Chunk into a Bloom filter vector (step 164);

Determining the segment ID of a given key using H0 hash function (step 166)

Encoding Key into Bloom filter segment using a K-bit array produced by H1, . . . Hk functions (step 168)

Figures 3, 3A:
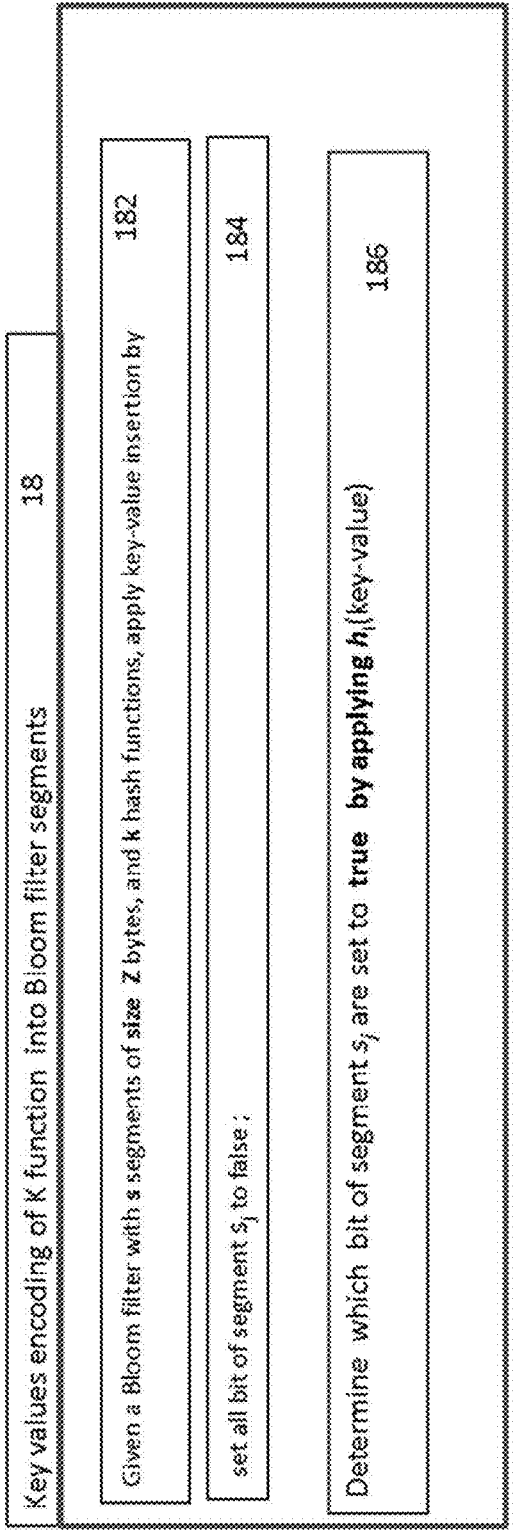
FIGS. 3 and 3A a flow diagram and pseudo-code, respectively, of Key values encoding of encoding process, according to some embodiments of the invention.

FIGS. 3 and 3A are a flow diagram and pseudo-code, respectively, of Key values encoding of encoding process, according to some embodiments of the invention. This processing includes the following steps:

Given a Bloom filter with s segments of size Z bytes, and k hash functions (182), apply key-value insertion by set all bit of segment $s_j$ to false (184), Determine which bit of segment $s_j$ are set to true by applying $h_i$(key-value) (186)

FIGS. 4 and 4A is a flow diagram, depicting the processing of packing bloom filter segments, according to some embodiments of the invention. This processing includes the following steps:

packing of segments into extents (data structure) where each extent include on segments of different chunks with the same id./index (step 202);

Determining packing factor (The number of the segments in each extent) for example can be determined by read memory size (packing factor) (step 204);

Packing into a single extent consecutive P segments of the same index according to chunk order (step 206);

Generating extent/segment map (step 208);

The extent data structure enable to reduce the number of files required for holding the Bloom filter, and improve I/O, by packing multiple segments having the same segment ID into a single extent and save it to disk. For example, a bloom filter for a chunk of size 1 MB, may include 16 segments size 64 KB each. When using packing factor of 16, each consecutive group of 16 chunks, all SBF segments with segment-id=1 of the 16 chunks in the group are packed into extent.1, and all segments with segment-id=2 for the 16 chunks in the group are packed into extent.2 and so on, as illustrated in FIGS. 4 and 4A. At the end of the packing procedure for each group of 16 chunks we end up with 16 extents with a total size of 16 MB. (the same size of 16 classical Bloom filter for corresponding chunks). However, each extent of 1 MB can be used for filtering 16 chunks.

Several Parameters Affect the Performance of a Bloom Filter chunk size—byte size of a chunk
segment size—byte size of a bloom filter segment
pack factor—number of segments packed in an extent
k—number of hash functions needed to hash a key
$h_0$—hash function used to compute the segment index for a given key value
$h_1, \ldots h_k$—hash functions for computing the hash bits for a given key value according to some embodiments of the present invention a single extent can filter multiple chunks, depending on a packing factor (the number of segments packed into a single extent), hence this structure of the extent is much more 20 efficient than using the orthogonal Bloom Filter algorithm to filter a single chunk at a time.

FIGS. 5 and 5A is a flow diagram and pseudo-code, respectively, depicting the computation module for processing of computing segment ID and hash bits vector according to some embodiments of the invention. This processing includes the following steps:

Applying $h_0$ function on key value to compute segment id/index (step 282);

Applying $h_i$ function on key value to compute hash bits vector for Each key-value (step 284);

FIGS. 6 and 6A is a flow and pseudo-code, respectively, diagram of chunk filtering module processing according to some embodiments of the invention, in which all big-table extents are selected and for each extent E, determine whether, or not, the chunks represented by E needs to be included in the SELECT by applying extent processing (step 302).

Figure 7:
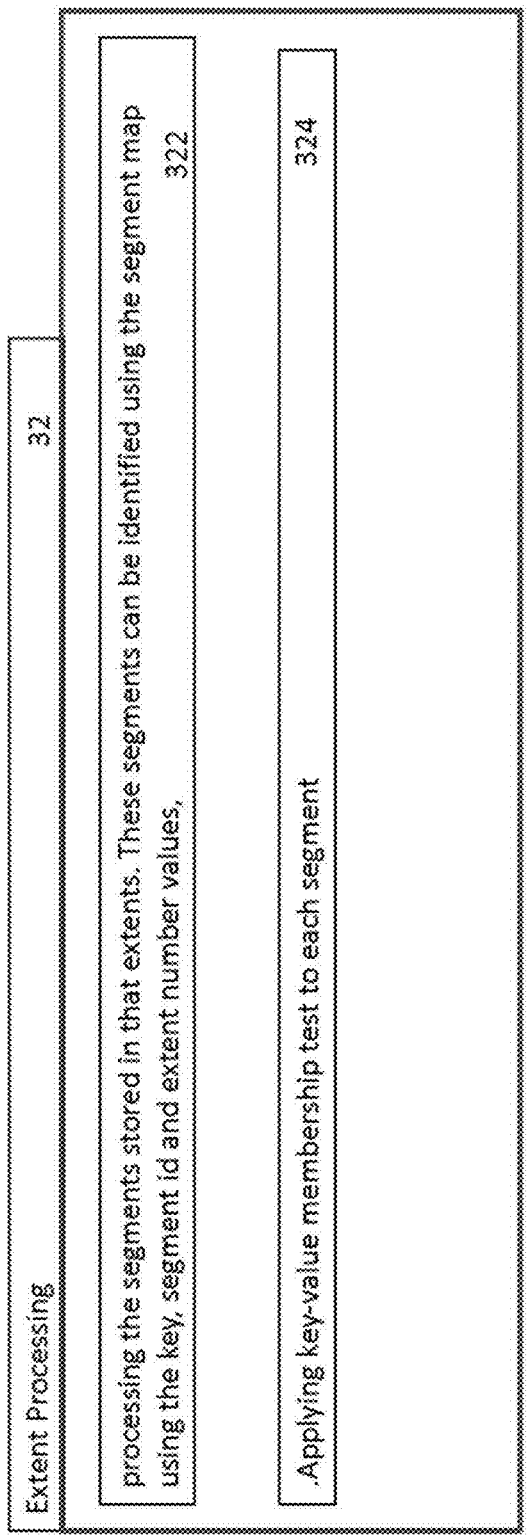
FIG. 7 illustrates Extent Processing, according to some embodiments of the invention.

FIG. 7 illustrates Extent module Processing, according to some 15 embodiments of the invention. This processing includes the following steps:

processing the segments stored in that extents. These segments can be identified using the segment map using the key, segment id and extent number values, (step 322); and Applying key-value membership test to each segment (step 324).

FIGS. 8 and 8A is a flow diagram and pseudo-code, respectively, of key-value membership test module processing, processing according to some embodiments of the invention.

Test membership for key value of Bloom filter for segment sj of size Z bytes, by applying k hash functions (step 342).

Calculate x key value by applying $h_i$(key-value) (step 344).

Check if X bit is true or false in segment (step 346).

FIGS. 9 and 9A is a flow diagram and pseudo-code, respectively, of mapping module processing according to some embodiments of the invention. This processing includes the following steps:

Maintaining relationships between data chunks, extents and segments by maintaining three map tables (step 222);

Maintaining chunk-map table by storing information about data chunks associate given chunk-number to chunk file path (step 224);

Maintaining extent-map table by storing information about extents; associate a given extent number to extent file path (step 226); and Mapping segment table (sbf-map table) by storing information about all segments maintaining the relationship between segments, extents and chunks (step 228).

Given a big table containing (key, value) pairs the Map Tables described below maintain the relationship between data chunks, extents and segments. There are three map tables.

Chunk Map Table

The chunk-map table stores information about data chunks; it maps a given chunk-number to chunk_ file path.
    chunk-map(chunk-number // unique id per chunk
        chunk_filepath,
        chunk_size)

Extent Map Table

The extent-map table stores information about extents; it maps a given extent number to extent file path.

extent-map(key,      // key field to which extent applies
segment_id,  // id of SBF segment to which extent
    applies; derived from $h_0$(key-value) //
    extent_number,// unique number per extent
        ,extent_filepath
        (extent_size

Segment Map Table

The sbf-map table stores information about all segments; it keeps the relationship between segments, extents and chunks.

```
segment-map(key,           // key field to which segment applies
    segment_id,  // id of SBF segment to which extent
        applies; derived from h0(key-value) //
segment_id,// unique number per segment_map
    extent_number, // extent containing this segment
    chunk_number, // chunk to which segment applies
        seg_index,       // index number inside extent
        seg_offset,      // byte offset within extent file
                seg_size)       // byte size of segment
```

Usage Example

According to some embodiment of the present invention the above map tables are implemented using SQL tables so that they can be queries using SQL as follows:

```
Query 1: display all extents for a given key and segment id values.

select E.extent_number, E.extent_size, E.extent_filepath
    from extent-map E,
    where E.key = key and E.segment_id = segment_id
```

```
Query 2: display the segment identified by key,
        segment_id and chunk_number.values select E.extent_size, E.extent_filepath, S.seg_offset,
        S.seg_size
    from segment_map S, extent_map E,
    where S.key = key and S.segment_id = segment_id
    and S.chunk_number = chunk_number
    and S.extent_number = extent_number
```

Using Membership Testing

The main benefit of employing a bloom filter for filtering records with a given <key> value is by avoiding reading chunks having no record with the provided <key> value. This can be done efficiently using the BDBF filter as suggested by the present invention.

The segmented bloom filtering algorithm according to the present invention guarantees that each key is hashed into exactly a single segment. Accordingly, once the segment id for a given <key> value is computed, there is a need to read all segments, requiring only to inspect the SBF segments corresponding to the segment-id. In other words, it is only required to read and inspect the extents corresponding to that segment-id.

This BDBF algorithm filter and minimizes the I/O cost in case of false filtering results. The benefits directly affect the cost of chunk access. this benefit has greater impact when the data chunks are distributed over multiple processor nodes.

Membership Testing

This section presents the principles of membership testing when using the BDBF filter algorithm. The following paragraph exemplify implementation of SQL SELECT operations of-selecting predicate of the form key=<key-value>. For example, <select * from big-table where big-table.key=<key-value In the following example is shown how the algorithm avoid reading chunks with records not including the predicate key=<key-value>.

Compute Segment-Id and Hash Bits Vector

Step (1): compute segment id and hash bits for <key-value>

Given Bloom filter with s segments each of seg size bytes, and k hash functions, key value insertion is done as following

```
bit_size = seg_size * 8
int hash_bits[bit_size] // bit vector for segment sj
j = h0(keyvalue);
// keyvalue will be hashed in segment sj
// reset the bits of segment sj
set all hash_bits[ ] of segment sj to false
for i=1,,k
{
    x = hi(keyvalue)
    mod bit_size
    hash_bits[x] = true
}
                            {
```

Chunk Filtering

Step (2): select all big-table extents and for each extent E, determine whether, or not, the chunks represented by E needs to be included in the SELECT. The number of chunks that can be filtered by a single extent is determined by the pack factor (see 003 definitions). Step (2) is implemented as follows

```
for each extent record E in
        select E.extent_number, E.extent_size, E.extent_filepath
    from extent-map E,
    where E.key = key and E.segment_id = segment_id
{
    unsigned char extent_buf[E.extent_size];
    fd = fdopen( E.extent_filepath, O_RDONLY);
    pread(fd, extent_buf, E.extent_size, 0);
    close(fd);
    int ignore_chunk_vec[pack_factor];
    BDBF_PROCESS_EXTENT(key, segment_id, E.extent_number,
                extent_buf, ignore_chunk_vec);
    for (i=0, i++; i<pack_factor) {
        int chunk_number = ignore_chunk_vec[i];
        if (chunk_number != -1)
            ignore data chunk with number chunk_number
    }
}
```

Extent Processing

Extent processing is performed to all the segments stored in that extents. These segments can be identified using the segment map using the key, segment id and extent number values, as implemented by the BDBF_PROCESS_EXTENT function.

Figure 10:
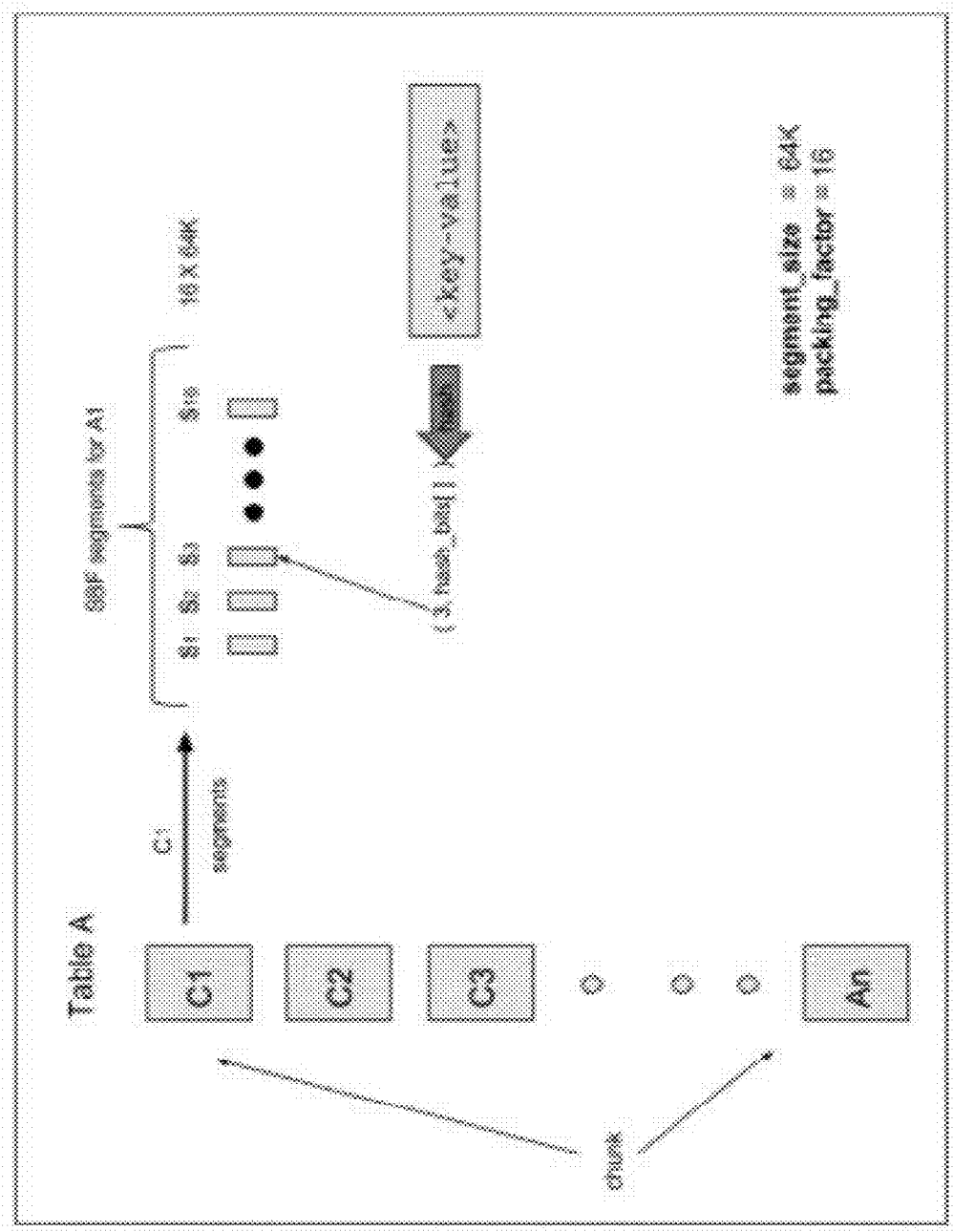
FIG. 10 is a visual example of bloom filter segmentation by chunks according to some embodiments of the invention.

FIG. 10 is a visual example of bloom filter segmentation by chunks according to some embodiments of the invention.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for applying bloom filter on a large data set consisting of key-value pairs, using at least one processor, the method comprising:
    partitioning large data-set of key-value pairs into equal byte sized data chunks;
    determining Bloom filter Vector size and number of segments S in the vector for each data chunk;
    Encoding all keys of a given Chunk into a dedicated Bloom filter vector;
    Determining the segment-id of a given key using H (0) hash function, wherein the H (0) hash function return a value between 1 and S;
    Encoding Key into a Bloom filter segment with said determined segment-id, using a K-bit array produced by H1, ... Hk functions;
    wherein Encoding Key into a given Bloom filter segment, is implemented by using k hash functions and setting the appropriate bits of the segment as follows: set all bits of the segment to false and then for each i=1 ... k set bit j of the segment to true where j=$h_i$(key-value);
    wherein said method characterized by:
        determining the number P (packing factor), of Bloom filter segments to be used for packing segments into an extent structure;
        columnar packing of segments into extent data structures where each extent includes segments of different chunks, but with the same segment-id, wherein the columnar packing stores segment according to segment-id, wherein the extent structure is a byte array;
    wherein a single extent supports testing membership of multiple chunks, depending on the number of segments packed into a single extent (packing factor), wherein the testing membership is applied by subsequent steps:
        applying $h_0$ function on a given key value to compute segment id J;
        applying $h_J$ function on key value to compute hash bits vector for the given key-value;
        testing membership for the given key value of Bloom filter compute hash bits vector for segment sj, by applying k hash functions.

2. A method for applying bloom filter on a large data set consisting of key-value pairs, using at least one processor, the method comprising:
    partitioning large data-set of key-value pairs into data chunks;
    determining Bloom filter Vector and number of segments in the vector for each data chunk;
    Encoding all keys of a given Chunk into a Bloom filter vector;
    Determining the segment-id of a given key using H (0) hash function;
    Encoding Key into a Bloom filter segment with said determined segment-id, using a K-bit array produced by H1, ... Hk functions;
    Packing of segments into extent data structures where each extent includes segments of different chunks, but with the same segment-id, segment-id wherein a single extent filters multiple chunks, depending on the number of segments packed into a single extent (packing factor);
    applying $h_0$ function on a given key value to compute segment sj id/index;
    applying $h_J$ function on key value to compute hash bits vector for the given key-value;
    testing membership for the given key value of Bloom filter for segment sj, by applying k hash functions.

3. The method of claim 1 wherein Encoding Key into a Bloom filter segment, is implemented by a Bloom filter with s segments of size Z bytes, and k hash functions, apply key-value insertion by: set all bit of segment $s_j$ to false and determine which bit of segment $s_j$ are set to true by applying $h_j$(key-value).

4. The method of claim 1 further comprising the step of determining packing factor (the number of the segments in each extent) is determined by read memory size.

5. The method of claim 1 further comprising the step of maintaining relationships between data chunks, extents and segments by maintaining at least one map table.

6. The method of claim 1 wherein the extent structure is a bit array structure, ordered by the index.

7. The method of claim 1 wherein the extent structure filter out multiple chunks in parallel and reduce the number of files required for holding the Bloom filter, guaranteeing that each key is hashed into exactly a single segment requiring only to read and inspect the extents corresponding to that segment-id.

8. The method of claim 5 wherein segments can be identified using the segment map using the key, segment id and extent number values.

9. A system for applying bloom filter on large data table of key-value for enabling efficient member testing, said system comprising a non-transitory storage device and one or more processing devices operatively coupled to the storage device on which are stored modules of instruction code executable by the one or more processors:
    bloom filter module for determining Bloom filter Vector size and number of segments S in the vector for each data chunk and encoding All Keys of a given Chunk into a dedicated Bloom filter vector, Determining the segment ID of a given key using H (0) hash function, wherein the large data table of key-value pairs partitioned into data chunks, wherein the H (0) hash function return a value between 1 and S;
    computation module for encoding Key into Bloom filter segments using a K-bit array produced by H1, ... Hk functions;
    wherein Encoding Key into a given Bloom filter segment, is implemented by using k hash functions and setting the appropriate bits of the segment as follows: set all bits of the segment to false and then for each i=1 ... k set bit j of the segment to true where j=$h_i$(key-value); and
    columnar packing module for packing of segments into extents data structure where each extent includes segments of different chunks with the same id/index; wherein the columnar packing stores segment according to segment-id; wherein the extent structure is a byte array membership test module, wherein a single extent supports testing membership of multiple chunks, depending on the number of segments packed into a single extent (packing factor), wherein the testing membership module is applied the following steps:
        applying $h_0$ function on a given key value to compute segment id J;
        applying $h_J$ function on key value to compute hash bits vector of bloom filter for the testing the given key-value;

testing membership for the given key value of Bloom filter compute hash bits vector for segment $s_j$, by applying k hash functions.

10. The system of claim 9 wherein Encoding Key into Bloom filter segments, is implemented by for a Given a Bloom filter with s segments of size Z bytes, and k hash functions, apply key-value insertion by: set all bit of segment $s_j$ to false and Determine which bit of segment $s_j$ are set to true by applying $h_i$(key-value).

11. The system of claim 9 wherein the packing module further comprising the step of determining packing factor is determined by read memory size.

12. The system of claim 9 further comprising the mapping module for maintaining relationships between data chunks, extents and segments by maintaining at least one map table.

13. The system of claim 9 wherein the extent structure is a bit array structure, ordered by the index.

14. The system of claim 9 wherein the extent structure enables filtering out multiple chunks in parallel and reduce the number of files required for holding the Bloom filter, guaranteeing that each key is hashed into exactly a single segment requiring only to read and inspect the extents corresponding to that segment-id.

15. The systems of claim 9 wherein segments can be identified using the segment map using the key, segment id and extent number values.

* * * * *